3,457,111
ALKALINE STORAGE BATTERY WITH
Be(OH)₂ IN THE ELECTROLYTE
Josef Witte, Frankfurt am Main, Marion Herrmann,
Bergen-Enkheim, Jurgen Woidt, Hagen-Haspe, and
Freimut Peters, Hagen, Germany, assignors to Varta
Aktiengesellschaft, Frankfurt am Main, Germany
Filed Dec. 30, 1966, Ser. No. 611,524
Claims priority, application Germany, Dec. 31, 1965,
V 30,074
Int. Cl. H01m $43/06, 43/04$
U.S. Cl. 136—24                                10 Claims

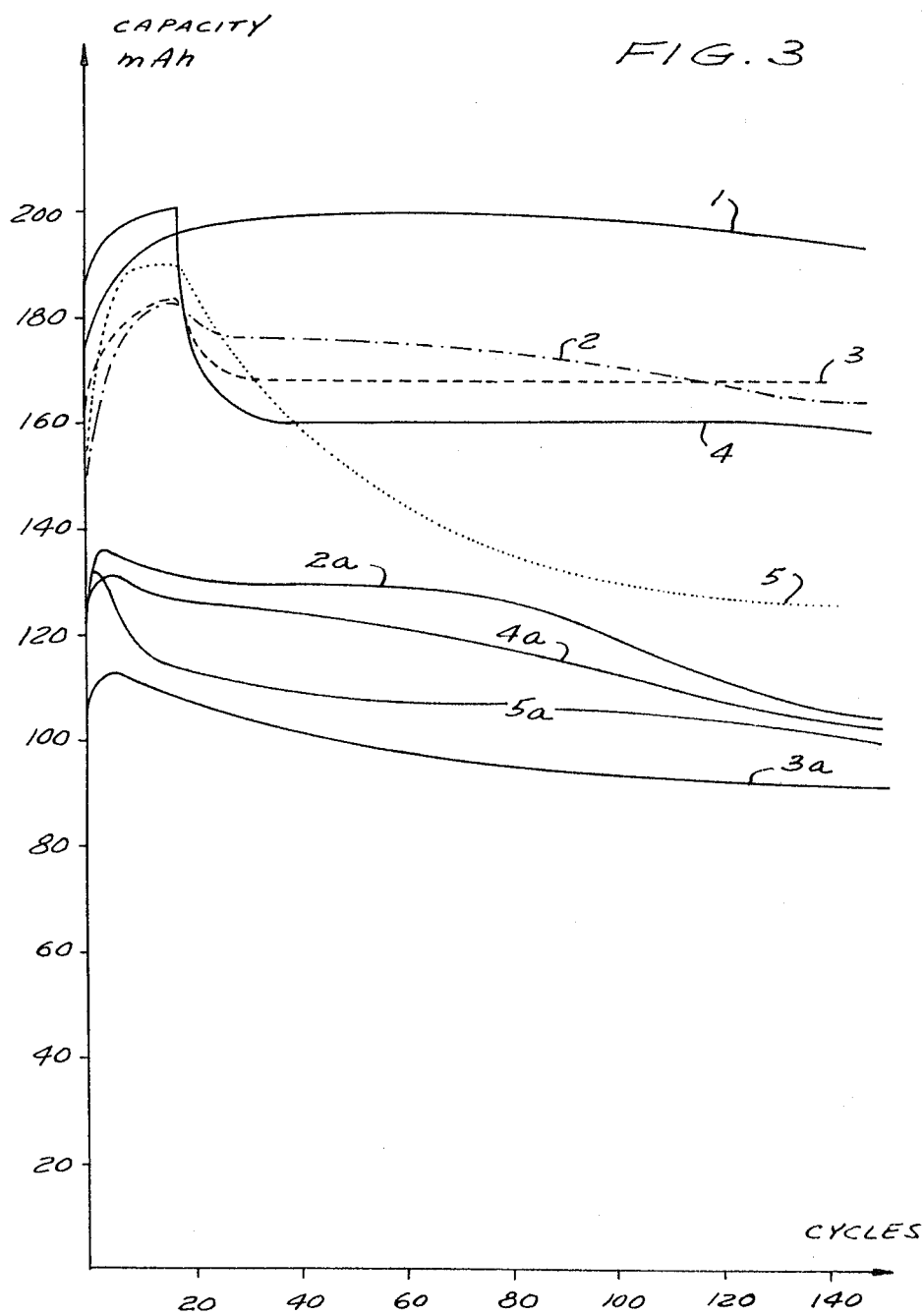

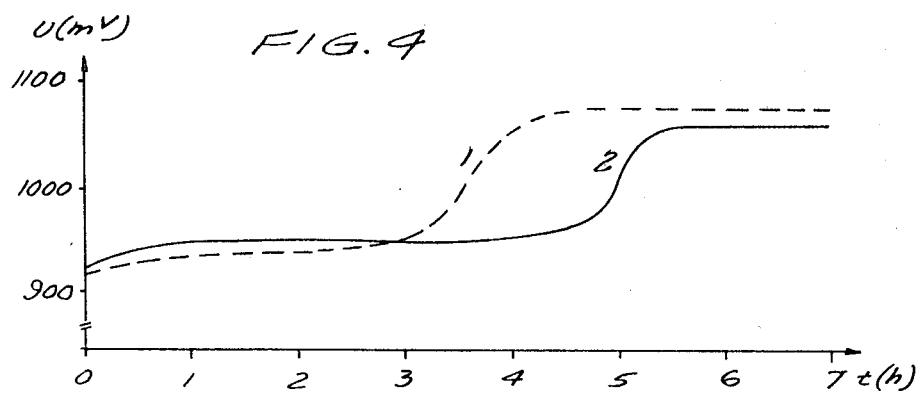
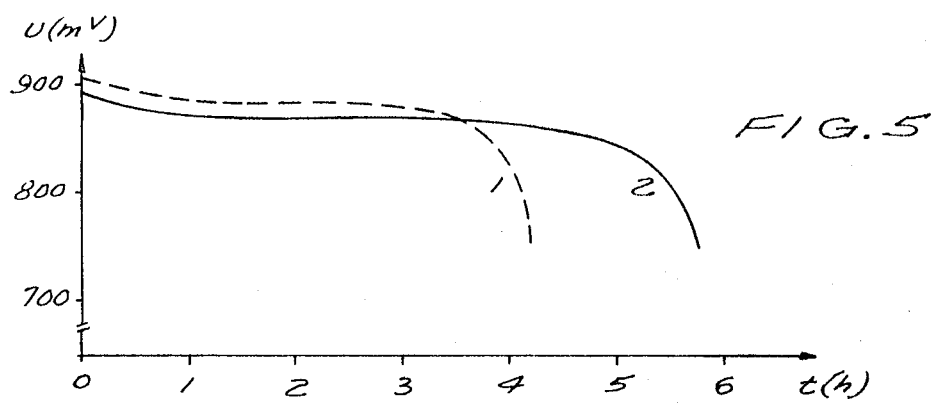
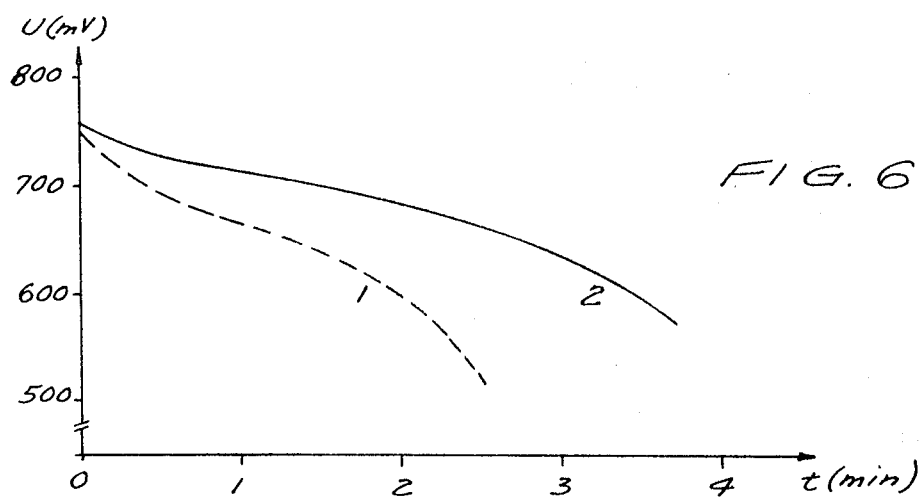

ABSTRACT OF THE DISCLOSURE

An alkaline storage battery the positive electrode of which includes active nickel hydroxide mass and the negative electrode of which preferably includes cadmium and/or iron mass, and including a liquid alkaline electrolyte in contact with the positive and negative electrodes and having dissolved therein beryllium hydroxide; and a method of forming such alkaline storage battery including preforming the positive electrode against an inert electrode in contact with an alkaline electrolyte.

BACKGROUND OF THE INVENTION

The present invention relates to an alkaline storage battery, and more particularly is concerned with improving the electrochemical behavior of alkaline storage batteries the positive electrodes of which includes active nickel hydroxide mass.

Storage batteries comprising positive nickel hydroxide electrodes are known, having an electrolyte of potassium hydroxide solution with or without an additive of lithium hydroxide. When the storage batteries are charged, the evolution of oxygen on the positive electrode starts already after two-thirds of the possible full charge has been effected, which means that under normal conditions full charging of the electrode can be obtained only with great difficulties.

Even more difficult are the conditions in an alkaline storage battery having a negative electrode containing iron. The positive electrode will be very soon contaminated by iron. As a result, the voltage necessary for the start of the evolution of oxygen on the positive electrode sinks 50 mv. below the evolution voltage of oxygen on an iron-free nickel electrode.

Consequently, on charging an iron-contaminated electrode the evolution of oxygen starts already shortly after the charging starts, thus in practically all cases preventing the electrode from being charged fully. For this reason it was impossible heretofore to operate positive sinter electrodes against negative iron electrodes. There is, for instance, a small amount of iron from the negative electrode dissolved in the electrolyte as "hydroxocomplex" which reaches the positive electrode and deposits on the surface of the active mass as iron-(III)-hydroxide and thereby reduces the overvoltage of oxygen.

SUMMARY OF THE INVENTION

The present invention proposes to overcome these difficulties and disadvantages and to improve the electrochemical behavior of alkaline storage batteries including nickel hydroxide mass in the positive electrode. Especially, the present invention is intended to improve the capacity and to stabilize the battery during cycle operation.

This is accomplished according to the present invention by dissolving in the liquid alkaline electrolyte of the storage battery an addition agent consisting of beryllium hydroxide in an amount such that the molar concentration of the beryllium hydroxide in the alkaline electrolyte equals at least 0.05 and preferably about 0.2. The maximum concentration of the beryllium hydroxide will be the saturation concentration thereof in the electrolyte.

The liquid alkaline electrolyte, as well as the structural features of the storage battery, are conventional, and thus the electrolyte generally will be an aqueous potassium hydroxide solution and the battery may be either of the open type or of the hermetically sealed type. The present invention is of particular importance in the case of positive sinter electrodes which offer a very great surface for possible contamination by iron.

In order to achieve the desired result, it is generally indicated to first form the positive electrode against an inert electrode while both electrodes are in contact with an alkaline electrolyte, prior to starting operation of the battery with an electrolyte having beryllium hydroxide dissolved therein.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a graphic illustration of the capacity of nickel electrodes over up to about 150 cycles; and FIGS. 4 to 9 are graphic illustrations showing the favorable influence of the additives which are incorporated in the alkaline electrolyte in accordance with the present invention with respect to negative cadmium electrodes.

DESCRIPTION OF THE PREFERRED EMBODIMENTS

According to the present invention, the liquid alkaline electrolyte of an alkaline storage battery, particularly a battery the positive electrode of which includes nickel hydroxide mass and the negative electrode of which includes cadmium and/or iron mass, includes, dissolved therein, an effective amount of beryllium hydroxide.

Tests of the voltage behavior of positive electrodes in alkaline nickel storage batteries surprisingly revealed that the addition of beryllium hydroxide Be(OH)₂ to the electrolyte consisting essentially of a solution of potassium hydroxide remarkably increases the overvoltage of oxygen, so that the oxygen gassing starts only after the electrode has been fully charged. This results in a substantial improvement in the capacity of the electrode. The same additives also have a favorable influence on the charge and discharge behavior of the positive electrode.

Figure 1:
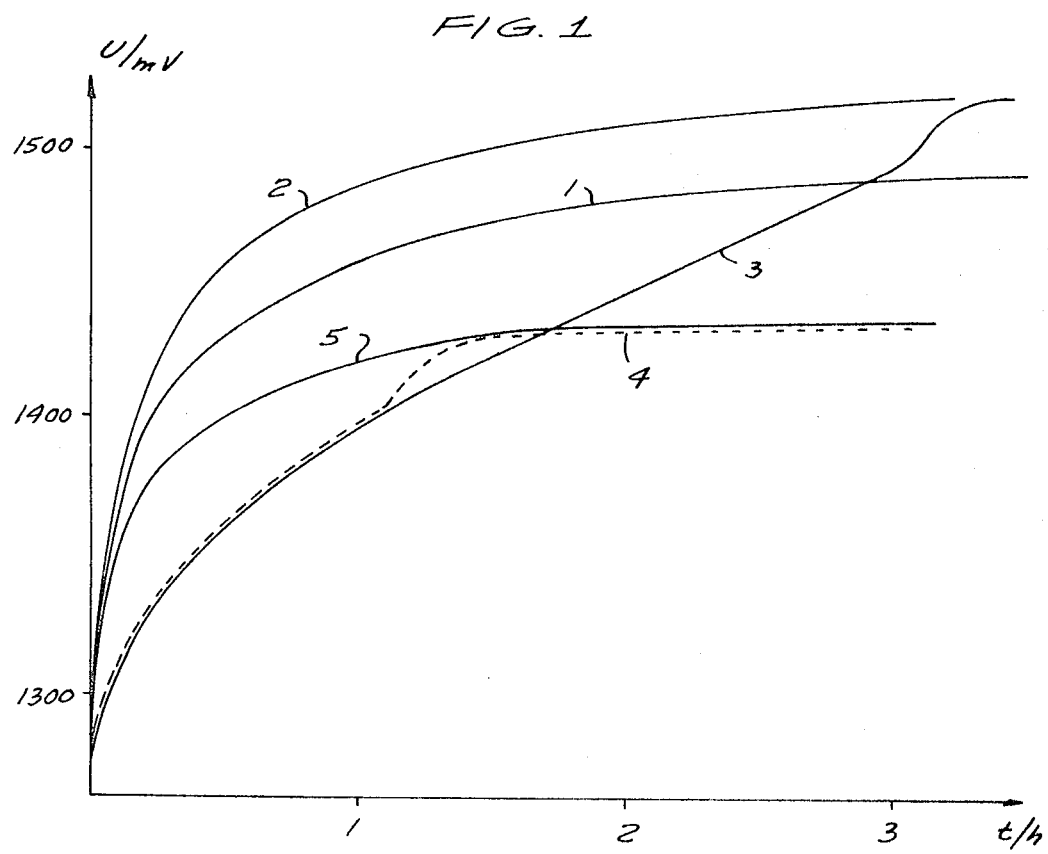
FIG. 1 is a graphic illustration of the charge curves of positive electrodes and the corresponding evolution voltage of oxygen curves.
Figure 2:
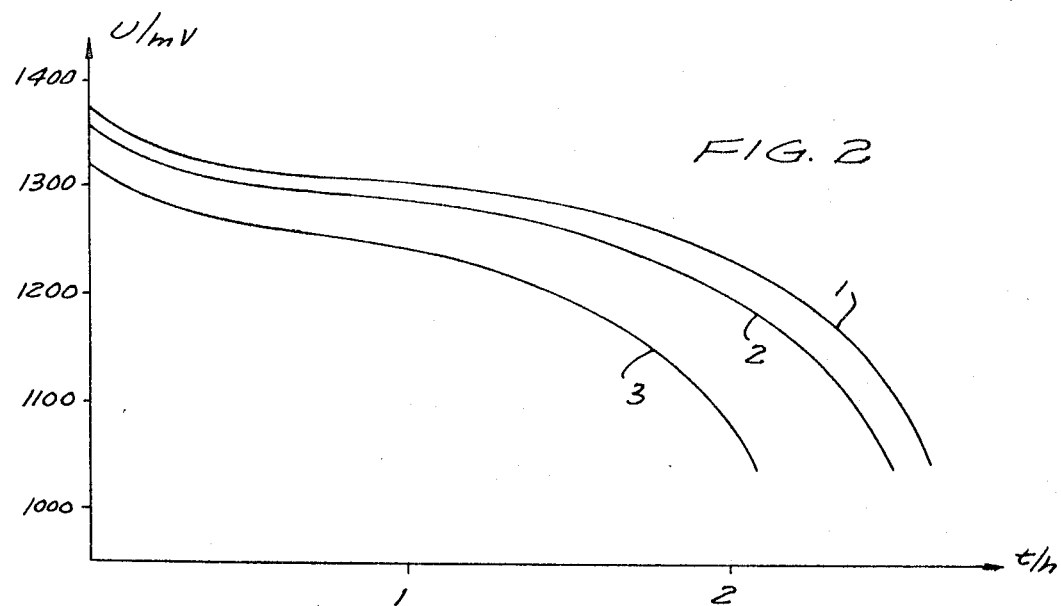
FIG. 2 is a graphic illustration of corresponding discharge curves.

FIGS. 1 and 2 briefly illustrate these conditions.

FIG. 1 is a graph of the charge curves of three positive electrodes and the corresponding evolution voltage of oxygen-curves. Curve 1 shows the oxygen-evolution voltage of the positive electrode in pure potassium hydroxide solution with or without an additive of LiOH, curve 2 shows the oxygen-evolution voltage in potassium hydroxide solution with an additive of Be(OH)₂.

The charge voltages are very similar in all these cases (curve 3) and rise with increasing state of charge so that finally the charge curves and the corresponding oxygen overvoltage curves meet. The oxygen gassing starts in pure or in LiOH-containing potassium hydroxide solution after attaining about two-thirds of the potentially possible full charge. Therefore, under normal conditions, a full charge will be only difficultly obtained. When the charging is performed, however, in potassium hydroxide solution with added $Be(OH)_2$, the oxygen overvoltage is about 40 mv. higher, which results in substantially delaying the oxygen evolution. In this case, the amount of charge will readily reach the 100% limit.

FIG. 2 is a graph of the discharge curves. The discharge voltages of an electrode discharged in potassium hydroxide solution with $Be(OH)_2$, (curve 1) is about 10 mv. higher than in pure potassium hydroxide solution (curve 2) and about 40 mv. higher than in potassium hydroxide solution with LiOH-additive (curve 3). This also results in obtaining a substantially higher utilization of the capacity. Even while discharging with high currents, a substantial increase of the capacity utilization may be obtained.

It has been further evident that small amounts of iron on the positive electrode remarkably lower the overvoltage of oxygen. Curve 4 of FIG. 1 shows the charge curve and curve 5 the oxygen-evolution voltage with respect to a positive iron-contaminated sinter electrode. The oxygen-evolution voltage (curve 4) is about 50 mv. lower than the one of an iron-free electrode in pure KOH solution.

As already pointed out above, when charging an iron-contaminated electrode, the oxygen evolution begins already shortly after the charging starts, preventing thereby the full charging of the electrode. Consequently, positive sinter electrodes were up to now rendered useless for operation against negative iron-electrodes. A small amount of iron from the negative electrode dissolved in the electrolyte as "hydroxocomplex," reached the positive electrode, and covered the surface of the electrochemically active mass with iron-(III)-hydroxide, thus lowering the oxygen overvoltage.

Even under the last-described conditions, it is surprisingly possible by proceeding in accordance with the present invention to influence the overvoltage of oxygen most favorably by adding $Be(OH)_2$ to an aqueous potassium hydroxide electrolyte. This will practically enable a full capacity utilization of the positive electrode during cycle-treatment against a negative iron-electrode. However, this will be achieved only if the positive electrode is preformed prior to cycle operation against an inert electrode such as a nickel sheet or foil, in pure potassium hydroxide solution or in $Be(OH)_2$ containing liquid alkaline electrolyte. The results of such a cycle test are shown in FIG. 3.

FIG. 3 refers to tests with pure potassium hydroxide solution and with potassium hydroxide solution containing $Be(OH)_2$, $Zn(OH)_2$ and LiOH dissolved therein. The curves clearly show that only two-thirds of the theoretically possible full charge are obtained when immediately at the start of the capacity test the positive sinter electrodes are cycle-treated against iron electrodes. On the other hand, only a small amount of capacity is lost when the positive sinter electrode is first preformed until reaching its normal capacity against an inert counter electrode of nickel sheet in potassium hydroxide solution with or without the $Be(OH)_2$ additive according to the invention. The capacity loss after replacing the inert electrode with an iron negative electrode is generally lower than 10% and drops to about 5% when using an additive of $Be(OH)_2$. LiOH, however, causes the highest loss of about 20%. Preformation and subsequent operation against an iron electrode in pure potassium hydroxide solution only, would be entirely insufficient and result in a very substantial loss of capacity.

FIG. 3 is an illustration of the results of these test series. Curve 1 depicts the capacity of a nickel electrode cycled against an inert counter electrode. Curve 2 illustrates the capacity of the preformed positive sinter electrode against an iron-containing negative electrode in $Be(OH)_2$-containing potassium hydroxide solution. Curve 2a shows the capacity behavior of a non-preformed positive electrode in potassium hydroxide with $Be(OH)_2$ additive, also against an iron-containing negative electrode.

Curves 3 and 3a represent the capacity relations when a preformed nickel electrode is cycled against an iron electrode in potassium hyroxide solution containing $Zn(OH)_2$, (curve 3) and when in otherwise similarly assembled storage batteries the positive electrode has not been preformed (curve 3a).

Curves 4 and 4a show the corresponding capacity behavior when the potassium hydroxide solution comprises lithium hydroxide.

If the same electrodes are operated in pure potassium hydroxide solution, results according to curve 5 for preformed positives and curve 5a for non-preformed positives are obtained.

FIG. 3 represents the capacity behavior up to about 150 charge-discharge cycles. The tests, however, when extended to 250 cycles, disclose that curves 2 and 3 show very little downward slope, whereas curve 4 with increasing numbers of cycles falls off rapidly.

The high oxygen overvoltage and the resulting improved capacity of the positive electrode in the system nickel/iron may be attributed to the fact that after or during the preformation active centers of the electrode surfaces are covered by the additive according to the invention so that these centers will not provide sites for iron adsorption later on.

In steel storage batteries having electrolytes which always comprise LiOH as an additive, negative iron electrodes could be used only because the surface conditions are different in the case of positive tubular electrodes. Only the free, perforated part of the electrochemically active surface of the tubular electrode may be reached by iron, whereas at sinter electrodes the available free surface is substantially larger and consequently the unfavorable effect of iron contamination is multiplied.

The concentration of the $Be(OH)_2$ additives in the electrolyte according to the invention may be from 0.05 molar up to the point where the electrolyte is saturated with $Be(OH)_2$ without causing any substantial difference in effectiveness. The tests herein referred to, however, used an additive concentration of about 0.2 molar, which is also about the optimum concentration.

The tests further showed that cells, having an electrolyte comprising $Be(OH)_2$ have a better behavior when being overcharged than cells without the additives according to the invention. Especially at higher temperatures when charging with constant voltage, the final currents are remarkably lower. This protects the cells from being overheated. A substantial increase in the usable capacity was accomplished. The average voltage level is improved most when discharging at high currents. By using negative cadmium electrodes together with the additives according to the invention a better utilization of the negative active mass will be obtained. The use of $Be(OH)_2$ increases the utilization by about 30%. The additive according to the invention has proved very satisfactorily serviceable in both open and gas-tight or hermetically sealed storage batteries.

As already mentioned hereinabove, negative Cd-electrodes when used in combination with an alkaline electrolyte containing the additive according to the present invention permits a better utilization of the active mass. FIGS. 4 to 9 show how these additives favorably influence the capabilities of the negative Cd electrodes. These tests were made with sinter foil-electrodes of 0.8 mm. thickness, having their pores filled with precipitated $Cd(OH)_2$ mass. The electrolyte was an aqueous KOH solution of 1.24 density.

FIG. 4 is a graph of the course of charge voltage, measured against a Hg/HgO reference electrode to enable a better reading of the voltage differences.

Curve 1 shows the time course of the charge voltage by using a pure KOH electrolyte. Already after about 3½ hours the voltage jumped more than 100 mv. and simultaneously the hydrogen evolution started.

When $Be(OH)_2$ was used according to the invention, it was surprising to discover that under the same test conditions the voltage jump of the charge voltage could be delayed for about 1½ hours, as shown in curve 2 in FIG. 4. At the same time, the voltage became 10 mv. lower towards the end of charging, which means that the hydrogen evolution could be substantially lessened during the charging, which in this case was carried out for 7 hours.

The highly improved efficiency of charging negative $Cd(OH)_2$ electrodes resulted in discharge curves such as shown in FIG. 5. Electrodes of the same type as the ones according to FIG. 4 were discharged with a current of about 100 ma. corresponding to a 5-hrs. discharge current.

By using a pure KOH electrolyte, the results according to discharge curve 1 were obtained. The discharge is here, for example, finished after 4 hours.

If the electrolyte contains an additive of $Be(OH)_2$ according to the invention, in this case, for example, 8 g. $Be(OH)_2$ per liter of KOH-solution, the discharge curve 2 of FIG. 5 is obtained. The middle discharge voltage is a little lower. The discharge time, however, when based upon a final voltage cut-off of 800 mv. against a Hg/HgO-reference electrode is extended for 1.5 hours. This amounts to a substantial capacity improvement.

Calculation indicates the improvement in efficiency of utilization as follows:

0.8 mm. thick negative sinter electrodes of alkaline storage batteries may have, for example, a theoretical capacity of about 4.6 a.h./dm.$^2$, based on $Cd(OH)_2$ content.

When using pure KOH electrolyte, a capacity of 2.9 a.h./dm.$^2$ at a 5-hrs. current was measured. This is a mass utilization of about 63%.

If the KOH electrolyte included the $Be(OH)_2$ additive according to the invention, the consumable capacity was increased to 3.9 a.h./dm.$^2$. The mass utilization increased therefore to 85% of the theoretical capacity, the effective capacity was increased by 35%.

Also, when multiplying the height of discharge current by 50, i.e. discharging with 5000 ma., a substantial improvement of the capacity occurred, as shown by curve 1 (without additive) and curve 2 (with $Be(OH)_2$-additive) of FIG. 6.

Figure 7:
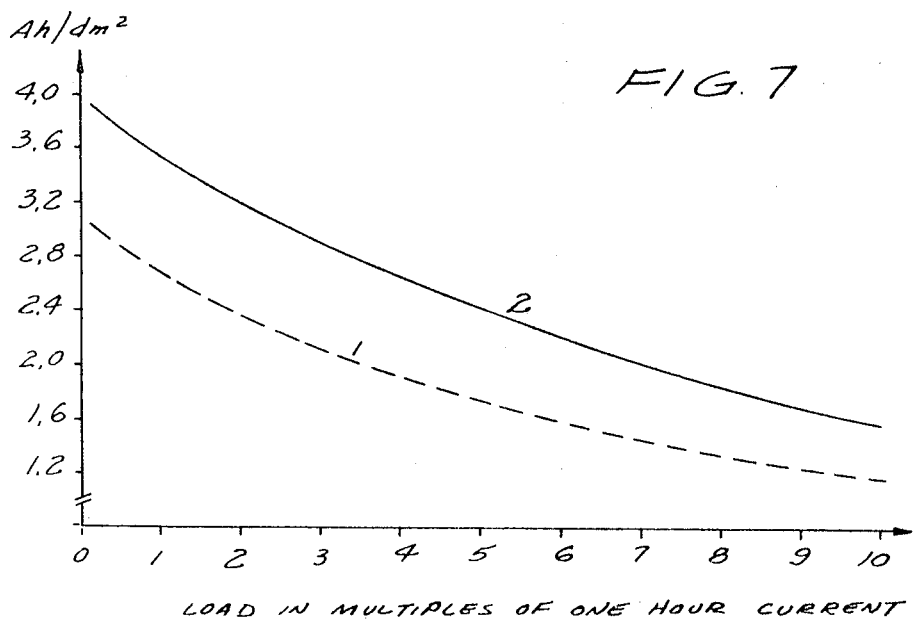

If the consumable capacity of negative Cd-electrodes is plotted as a function of load current, it corresponds to curves 1 and 2 of FIG. 7. When discharging with a 5-hrs. current, a capacity of about 3.0 a.h./dm. for example could be utilized if the electrolyte did not contain $Be(OH)_2$. When the value of load during the 5 hours of the height of current was multiplied by 50, the capacity dropped to about 1.2 a.h./dm.$^2$ (curve 1, FIGURE 7).

When using the $Be(OH)_2$ additive according to the present invention, the above values increased to 3.9 a.h./dm.$^2$ and 1.6 a.h./dm.$^2$, respectively, according to curve 2 of FIG. 7.

Figure 8:
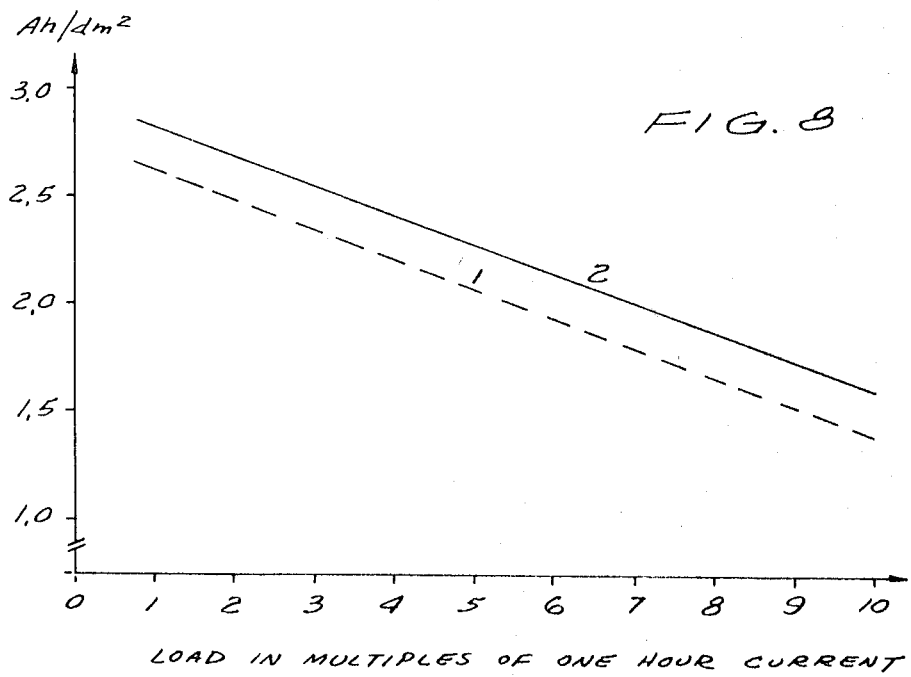

Comparative measurements of the dependency of consumable capacity on current drain for positive Ni-sinter electrodes are illustrated in FIG. 8.

It is shown in FIG. 8 that with the additive of the invention, $Be(OH)_2$, the consumable capacity in the test range of loads and under the selected test conditions is constantly about 0.2 a.h./dm.$^2$ higher (curve 2) than without $Be(OH)_2$ additive (curve 1). Corresponding thereto, the percentage relative capacity increase at high currents is higher than at low currents.

The behavior of the positive and negative electrode during charge may be summarized as follows:

At the positive electrode, for example, upon charging with a 5 hours current, the overvoltage of oxygen is about 40 mv. higher, the overvoltage of hydrogen at the negative electrode about 10 to 15 mv. higher, if the electrolyte contains $Be(OH)_2$. This means, that there is a total increase in the on-charge voltage of about 30 mv. for the cell.

If a 19-cell battery is charged, for instance, the battery counter voltage is increased during the charge for 19 times 30 mv., i.e. for almost 0.6 v. This is especially important for charging a battery with a constant charging voltage under conditions where surrounding- and electrolyte temperature substantially exceed normal indoor temperatures. This advantage is further illustrated by the example of overcharging an already fully charged 19-celled battery of 24 v., 4 a.h. (FIG. 9).

At the start of the overcharge while using a constant voltage of, for example, 1.58 v. per cell, the charge current starts with a relatively high value, but drops during the course of the first charging hour to a fraction of the initial value and finally reaches after about 1.5 hrs. a minimum, in the present example of 0.4 a. Upon continued overcharging carried out in this case at a cell- and surrounding temperature of $+36°$ C. (curve 1, FIG. 9) the charge current permanently increases, which among other facts leads to excessive and non-permissible overheating of the cells, and thus of the entire battery, finally causing the feared "run-away."

Figure 9:
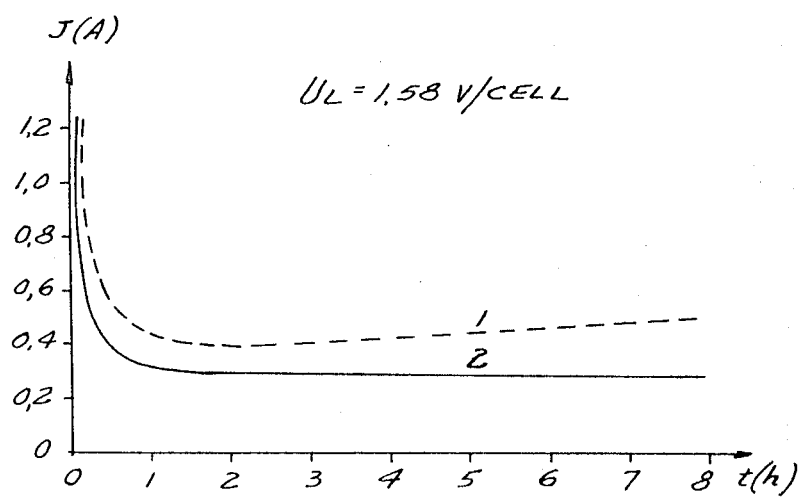

Curve 2 of FIG. 9 shows that the charge characteristics are, nevertheless, most favorably influenced by adding $Be(OH)_2$ to the electrotype, and the charge current after reaching at first high values drops as a result of the higher battery counter voltage to a lower value than without $Be(OH)_2$ additive—in the example about 0.3 a.—and then remains permanently at the same value, thereby preventing the harmful overheating of the battery and eliminating the "run-away" effect.

It will be understood that each of the elements described above, or two or more together, may also find a useful application in other types of batteries differing from the types described above.

While the invention has been illustrated and described as embodied in an alkaline storage battery of the open or heremetically sealed type, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be protected by letters Patent is set forth in the appended claims.

We claim:

1. An alkaline storage battery, comprising, in combination, a housing; at least one positive electrode including active nickel hydroxide mass, and at least one negative electrode including active cadimum mass located in said housing; a liquid alkaline electrotype in contact with said positive and negative electrodes; and $Be(OH)_2$ dissolved in said liquid alkaline electrolyte.

2. A storage battery as defined in claim 1, wherein said housing is hermetically sealed.

3. A storage battery as defined in claim 1, wherein said electrodes are sinter electrodes and housing includes means for communication between the interior of said housing and the outer atmosphere.

4. A storage battery as defined in claim 1, wherein said $Be(OH)_2$ is present in said alkaline electrolyte in at least 0.05 molar concentration.

5. A storage battery as defined in claim 1, wherein said dissolved $Be(OH)_2$ is present in said alkaline electrolyte in between 0.05 molar concentration and the saturation concentration of said hydroxide in said electrolyte.

6. A storage battery as defined in claim 1, wherein said dissolved $Be(OH)_2$ is present in said alkaline electrolyte in about 0.2 molar concentration.

7. A storage battery as defined in claim 1, wherein at least said positive electrode is a sinter electrode, and said liquid alkaline electrolyte in which said $Be(OH)_2$ is dissolved consists essentially of an aqueous potassium hydroxide solution.

8. A method of forming an alkaline storage battery including at least one positive electrode including active nickel hydroxide mass, and at least one negative electrode including active cadmium mass and a liquid alkaline electrolyte in contact with said positive and negative electrodes and $Be(OH)_2$ dissolved in said alkaline electrolyte comprising the step of preforming said positive electrode against an inert electrode in contact with an alkaline electrolyte prior to starting operation of said battery.

9. A method as defined in claim 8, wherein said positive electrode is a sinter electrode, and said alkaline electrolyte consists of a substantially pure aqueous solution of potassium hydroxide.

10. A method as defined in claim 8, wherein said electrode is a sinter electrode and said electrolyte consists of an aqueous solution of potassium hydroxide having $Be(OH)_2$ dissolved therein.

References Cited

UNITED STATES PATENTS

| 1,955,115 | 4/1934 | Drumm | 136—154 |
| 2,634,303 | 4/1953 | Moulton | 136—154 |
| 2,696,515 | 12/1954 | Koren et al. | 136—154 |
| 3,274,028 | 9/1966 | Okinaka et al. | 136—28 |
| 3,317,347 | 5/1967 | Coleman et al. | 136—28 |

ALLEN B. CURTIS, Primary Examiner

C. F. LE FEVOUR, Assistant Examiner

U.S. Cl. X.R.

136—28, 154